(12) United States Patent
Huang et al.

(10) Patent No.: US 12,176,798 B2
(45) Date of Patent: Dec. 24, 2024

(54) ROTARY TABLE WITH LEAKAGE DETECTION FUNCTION

(71) Applicant: HIWIN TECHNOLOGIES CORP., Taichung (TW)

(72) Inventors: Li-Wen Huang, Taichung (TW); Yu-Ming Lin, Taichung (TW); Chih-Hao Ho, Taichung (TW); You-Chen Chen, Taichung (TW)

(73) Assignee: HIWIN TECHNOLOGIES CORP., Taichung (TW)

( * ) Notice: Subject to any disclaimer, the term of this patent is extended or adjusted under 35 U.S.C. 154(b) by 469 days.

(21) Appl. No.: 17/571,188

(22) Filed: Jan. 7, 2022

(65) Prior Publication Data
US 2023/0223821 A1 Jul. 13, 2023

(51) Int. Cl.
*H02K 9/193* (2006.01)
*B23H 11/00* (2006.01)
*H02K 5/20* (2006.01)

(52) U.S. Cl.
CPC ............. *H02K 9/193* (2013.01); *H02K 5/203* (2021.01); *B23H 11/003* (2013.01); *H02K 2205/09* (2013.01)

(58) Field of Classification Search
CPC .......... H02K 9/193; H02K 5/203; H02K 5/20; H02K 2205/09; B23H 11/003
See application file for complete search history.

(56) References Cited

U.S. PATENT DOCUMENTS

| 7,692,553 | B2 | 4/2010 | Kubala |
| 2010/0171270 | A1 | 7/2010 | Gail et al. |
| 2015/0053651 | A1 | 2/2015 | Yamasaki |
| 2015/0290734 | A1* | 10/2015 | Yamasaki ............ B23H 11/003 219/69.11 |
| 2019/0091822 | A1* | 3/2019 | Kappelmueller ......... F16N 7/38 |

FOREIGN PATENT DOCUMENTS

| CN | 108818010 A | * | 11/2018 | ............... B23Q 1/52 |
| EP | 1621863 A2 | * | 2/2006 | ............ F16J 15/3296 |
| JP | 2005249008 A | | 9/2005 | |
| JP | 2017153264 A | * | 8/2017 | |
| KR | 10-2015-0024270 A | | 3/2015 | |

OTHER PUBLICATIONS

English translation of EP-1621863-A2 (Year: 2006).*

* cited by examiner

*Primary Examiner* — Tulsidas C Patel
*Assistant Examiner* — Joshua Kiel M Rodriguez
(74) *Attorney, Agent, or Firm* — MUNCY, GEISSLER, OLDS & LOWE, P.C.

(57) ABSTRACT

A rotary table includes a housing having a first groove, a second groove and a drainage channel connecting the first groove and the second groove, a motor, a shaft located in the housing and provided with a guide portion, and a leak detection belt set in an accommodation chamber in the housing and embedded in the second groove. In this way, if liquid enters the housing, the guide portion of the shaft guides the liquid into the first groove, so that the liquid reaches the second groove along the drainage channel. At this time, the leak detection belt can be used for leakage detection to protect key components.

8 Claims, 5 Drawing Sheets

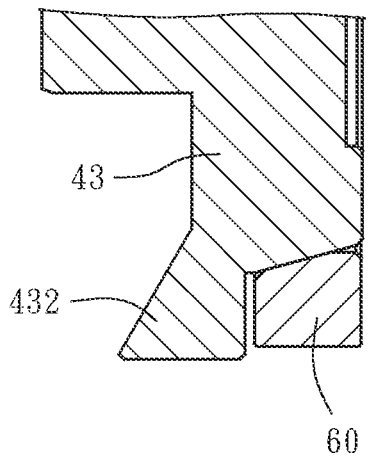
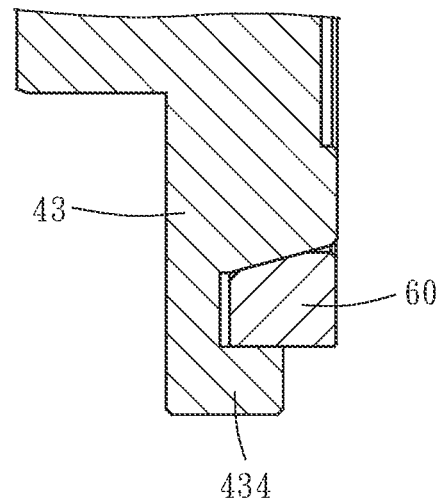
FIG. 5  FIG. 6
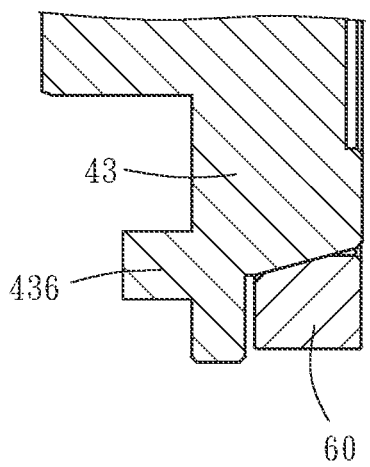
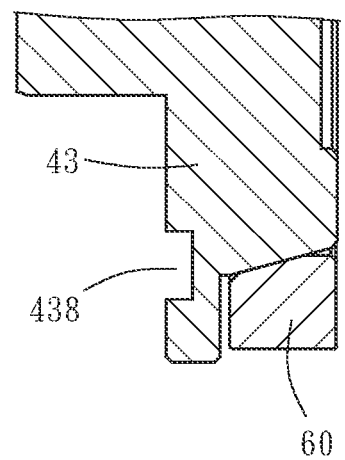
FIG. 7  FIG. 8

ROTARY TABLE WITH LEAKAGE DETECTION FUNCTION

BACKGROUND OF THE INVENTION

1. Field of the Invention

The present invention relates to rotary table technology and more particularly, to a rotary table with leakage detection function.

2. Description of the Related Art

The leak detection system disclosed in U.S. Pat. No. 7,692,553 B2 sets the sensor between the bearing assembly and the backup sealing system to sense whether the coolant has leaked. In the aforementioned patent document, when the sensor senses that the coolant is leaking, the leaked coolant has often passed through the bearing assembly, causing the bearing assembly to be easily damaged. Once there is a problem with the bearing assembly, it will also affect the operation of other key components (such as the rotor). Therefore, the aforementioned patent document still has room for improvement in structure.

SUMMARY OF THE INVENTION

The present invention has been accomplished under the circumstances in view. It is the main object of the present invention to provide a rotary table with leakage detection function, which has a leakage detection function to prevent key components from being damaged by infiltrated liquid.

In order to achieve the above main object, the rotary table of the present invention comprises a housing, a motor, a shaft and a leak detection belt. The housing comprises an accommodation chamber. The accommodation chamber has the chamber wall thereof provided with a first groove, a second groove and a drainage channel. The drainage channel has opposing front end and rear end thereof connected to the first groove and the second groove respectively. The motor is located in the accommodation chamber of the housing to provide a source of power. The shaft is rotatably installed in the accommodation chamber of the housing and connected to the motor, so that the shaft can be driven by the motor to rotate. The shaft has a first end and a second end, and the outer circumference of the first end of the shaft has a guide portion. The leak detection belt is set in the accommodation chamber of the housing and a part of the leak detection belt is set in the second groove of the housing.

It can be seen from the above that if liquid enters the accommodation chamber, the guide portion of the shaft will guide the liquid into the first groove, and then the liquid will follow the drainage channel to the second groove and contact the leak detection belt. At this time, the leak detection belt can be triggered to send a detection signal to a controller to remind the operator to shut down to avoid the key components (such as the motor) from being damaged by the liquid.

Preferably, the housing has a shaft hole at the front end. The accommodation chamber is axially connected to the shaft hole. The first groove is closer to the shaft hole than the second groove. The first end of the shaft partially protrudes out of the housing through the shaft hole of the housing, and the guide portion is located in the accommodation chamber of the housing.

Preferably, the rotary table of the present invention also comprises a rotary seal member. The rotary seal member is arranged in the shaft hole of the housing and abuts the outer peripheral surface of the first end of the shaft, and forms a diversion channel with the guide portion of the shaft. The diversion channel connects to the first groove of the housing. Thereby, if the rotary seal member fails and liquid enters the accommodation chamber, the guide portion of the shaft will guide the liquid into the first groove through the diversion channel, and reach the second groove and the leak detection belt along the drainage channel belt contact.

Preferably, the rotary table of the present invention further comprises a protected component. The protected component is provided in the shaft and located at the guide portion of the shaft back to the side of the rotary seal member, and the guide portion prevents the liquid from being sprayed directly to the protected component.

Preferably, the outer diameter of the protected component is smaller than the outer diameter of the guide portion of the shaft, and the difference in size between the protected component and the guide portion prevents liquid from flowing to the protected component.

Preferably, the distance between the first groove and the accommodation chamber is smaller than the distance between the second groove and the accommodation chamber, so that the two have a height difference to facilitate the drainage of liquid.

Preferably, the extension direction of the first groove and the extension direction of the second groove are both perpendicular to the axial direction of the shaft, and the extension direction of the drainage channel is parallel to the axial direction of the shaft. The aforementioned processing can be achieved by drilling the housing.

Preferably, the distance between the drainage channel and the accommodation chamber gradually increases from the first groove to the second groove, so that the drainage channel has a slope design to facilitate the drainage of the liquid.

Preferably, the guide portion can have different structural designs depending on the nature of the liquid. For liquids with higher viscosity, the guide portion protrudes an oblique corner portion from one side thereof opposite to the rotary seal member, or the guide portion protrudes a hook portion from one end thereof toward the direction of the rotary seal member. The oblique corner portion or hook portion provides a diversion effect to the liquid with higher viscosity. As for liquids with low viscosity, the guide portion protrudes from a side surface thereof opposite to the rotary seal member with an annular flange or is recessed with an annular groove. The labyrinth design formed by the annular flange and the annular groove matched with the corresponding concave-convex structure does protect the protected component on the one hand, and on the other hand, it provides a diversion effect for the liquid with lower viscosity.

The detailed structure, features, assembly or use of the rotary table with leakage detection function provided by the present invention will be described in the detailed description of the subsequent implementation. However, those with ordinary knowledge in the field of the present invention should be able to understand that these detailed descriptions and specific embodiments listed in the implementation of the present invention are only used to illustrate the present invention, and are not intended to limit the scope of the patent application of the present invention.

BRIEF DESCRIPTION OF THE DRAWINGS

FIG. 5 is a partial cross-sectional view of the shaft and the protected component provided by the rotary table of the present invention, mainly showing a different implementation of the guide portion of the shaft.

FIG. 6 is a partial cross-sectional view of the shaft and the protected component provided by the rotary table of the present invention, mainly showing another different implementation of the guide portion of the shaft.

FIG. 7 is a partial cross-sectional view of the shaft and the protected component provided by the rotary table of the present invention, mainly showing still another different implementation of the guide portion of the shaft.

FIG. 8 is a partial cross-sectional view of the shaft and the protected component provided by the rotary table of the present invention, mainly showing still another different implementation of the guide portion of the shaft.

DETAILED DESCRIPTION OF THE INVENTION

Figure 1:
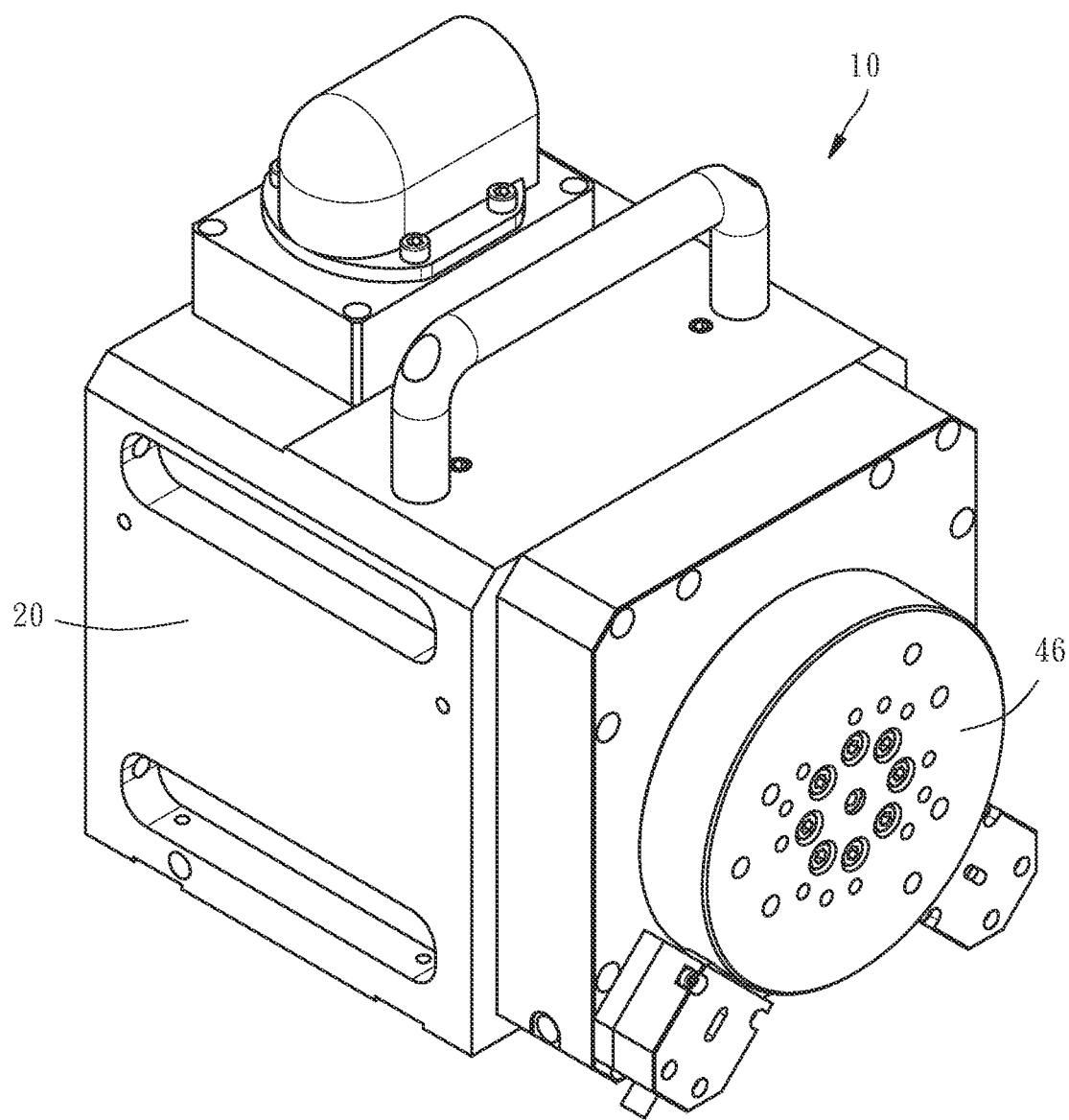
FIG. 1 is an elevational view of the rotary table with leakage detection function of the present invention.

The applicant first explains here that throughout the specification, including the embodiments described below and the claims in the scope of the patent application, the nouns related to directionality are based on the directions in the drawings. Secondly, in the embodiments and drawings that will be introduced below, the same component numbers represent the same or similar components or their structural features.

Figure 4:
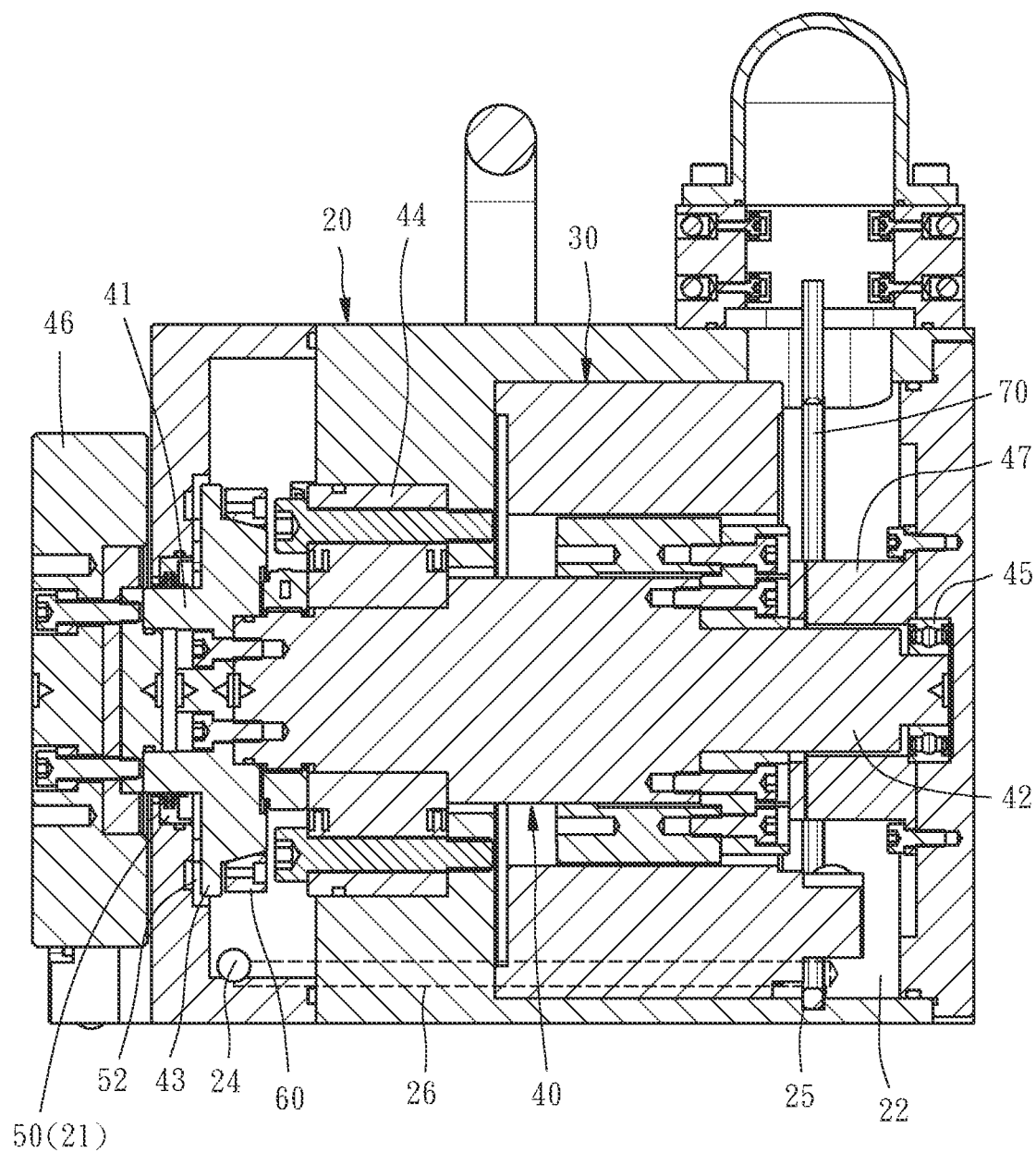
FIG. 4 is a sectional view of the rotary table of the present invention.

Please refer to FIG. 1 and FIG. 4, the rotary table 10 of the present invention takes a single-axis horizontal worktable as an example in this embodiment, which comprises a housing 20, a motor 30, a shaft 40, and a rotary seal member 50, a protected component 60, and a leak detection belt 70.

Figure 2:
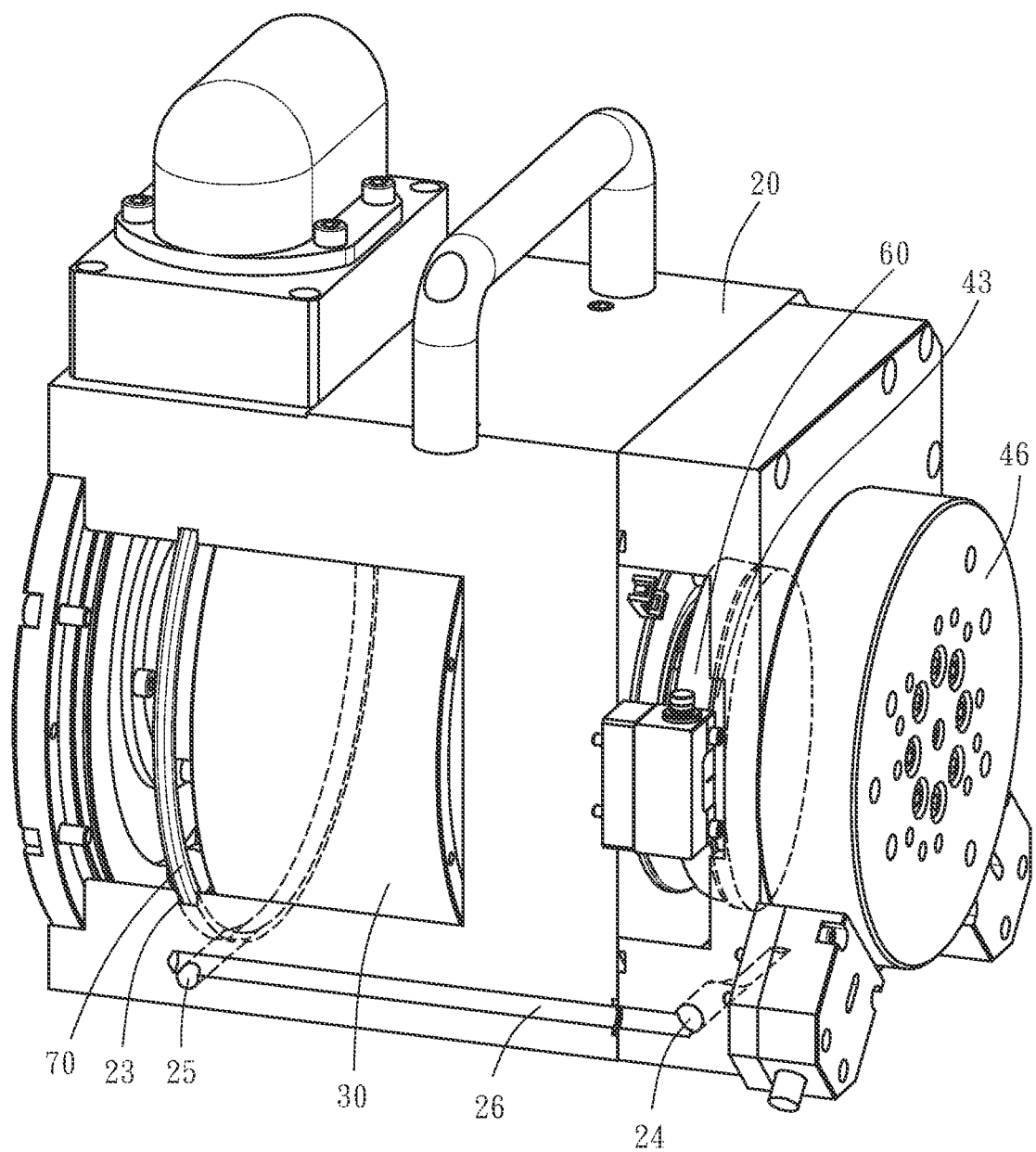
FIG. 2 is a partial cross-sectional view of the rotary table of the present invention, mainly showing the location of the first groove, the second groove and the drainage channel.
Figure 3:
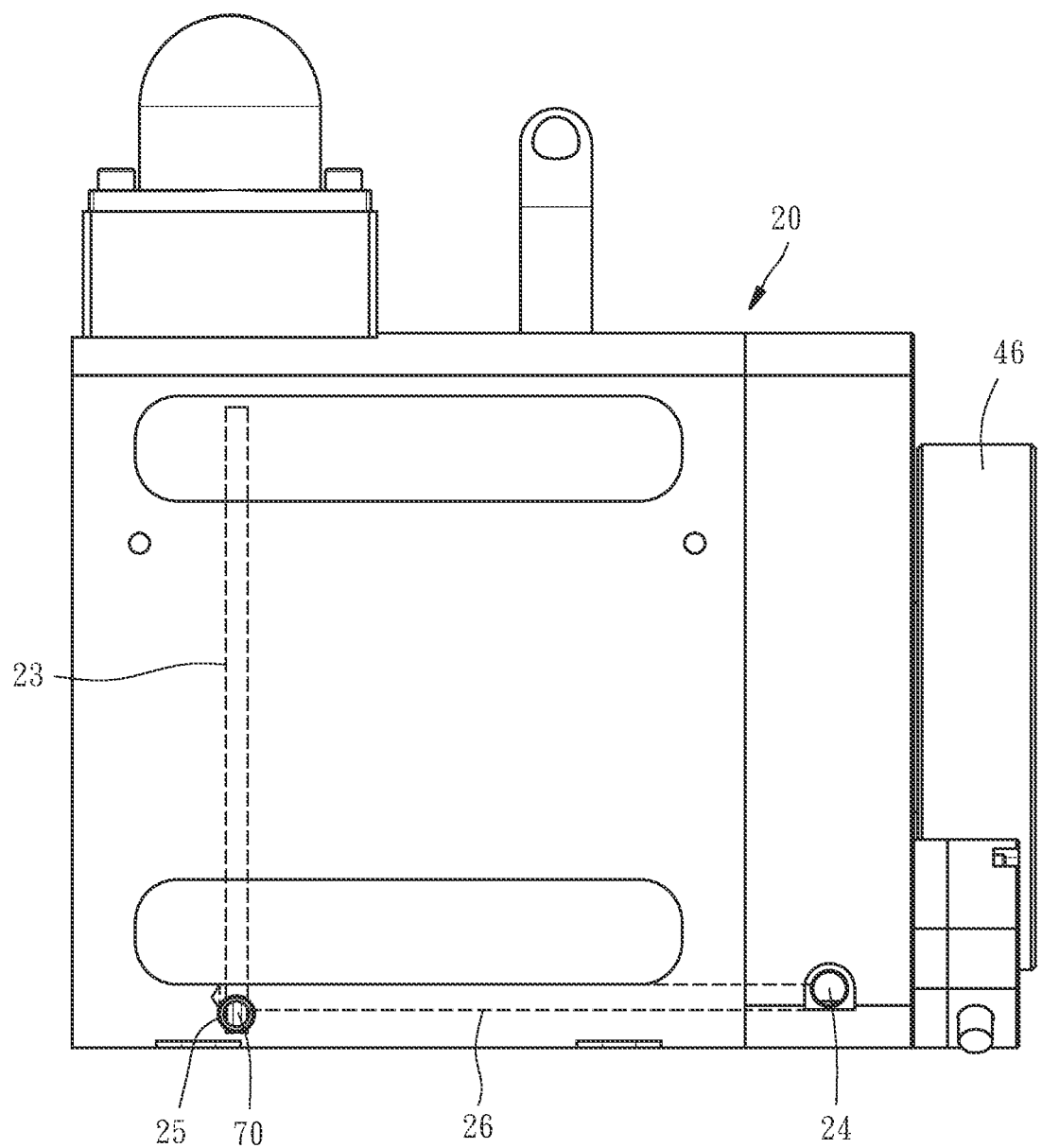
FIG. 3 is a side view of the rotary table of the present invention, mainly showing the location of the first groove, the second groove and the drainage channel.

The front end of the housing 20 has a shaft hole 21, the inside of the housing 20 has an accommodation chamber 22 that is axially connected to the shaft hole 21, and the rear end of the housing 20 has an annular positioning groove 23 on the chamber wall of the accommodation chamber 22. By drilling the housing 20, as shown in FIGS. 2 and 3, the housing 20 forms a first groove 24, a second groove 25 and a drainage channel 26 in the chamber wall of the accommodation chamber 22. The extension direction of the first groove 24 is perpendicular to the axial direction of the shaft hole 21, the extension direction of the second groove 25 is perpendicular to the axial direction of the shaft hole 21, and the extension direction of the drainage channel 26 is parallel to the axial direction of the shaft hole 21. The first groove 24 is closer to the shaft hole 21 than the second groove 25, that is, the first groove 24 is close to the front end of the housing 20, the second groove 25 is close to the rear end of the housing 20. The second groove 25 and the annular positioning groove 23 are tangent and connected. The front and rear ends of the drainage channel 26 are respectively connected to the first groove 24 and the second groove 25. As shown in FIG. 4, in this embodiment, the distance between the first groove 24 and the accommodation chamber 22 is smaller than the distance between the second groove 25 and the accommodation chamber 22, so that there is a height difference between the two to facilitate the flow of liquid from the first groove 24 to the second groove 25 along the drainage channel 26. It is worth mentioning here that first groove 24 and second groove 25 can also be designed to be at the same height according to actual needs. In addition, the drainage channel 26 is designed to have a slope. In this way, the distance between the drainage channel 26 and the accommodation chamber 22 is gradually increased from the first groove 24 to the second groove 25, so that the liquid can also be guided to flow from the first groove 24 along the drainage channel 26 to the second groove 25.

The motor 30 is installed in the accommodation chamber 22 of the housing 20 to provide a source of power.

The shaft 40 passes through the accommodation chamber 22 of the housing 20 and is connected to the motor 30, so that the shaft 40 can be driven by the motor 30 to rotate. As shown in FIG. 4, the shaft 40 has a first end 41 and a second end 42. The first end 41 of the shaft 40 and the second end 42 of the shaft 40 are supported by a first bearing 44 and a second bearing 45, respectively. In addition, the first end 41 of the shaft 40 is partially protruded from the housing 20 through the shaft hole 21 of the housing 20 and connected to a turntable 46, so that the shaft 40 can drive the turntable 46 to act in synchronization. The second end 42 of the shaft 40 is connected to a brake 47 located behind the motor 30, so that the shaft 40 can be controlled by the brake 47 to slow down or stop in an emergency. The outer periphery of the first end 41 of the shaft 40 has a ring-shaped guide portion 43, and the guide portion 43 is located in the accommodation chamber 22 of the housing 20.

As shown in FIG. 4, the rotary seal member 50 is set in the shaft hole 21 of the housing 20 and abuts the outer peripheral surface of the first end 41 of the shaft 40 to prevent liquid from entering the accommodation chamber 22 through the shaft hole 21 and a diversion channel 52 is formed between the rotary seal member 50 and the guide portion 43 of the shaft 40, and the diversion channel 52 is connected to the first groove 24 of the housing 20.

The protected component 60 is an encoder in this embodiment, but in fact it is not limited to an encoder. As shown in FIG. 4, the protected component 60 is installed on the shaft 40 and located behind the guide portion 43 of the shaft 40 (that is, on the side of the guide portion 43 opposite to the rotary seal member 50). The outer diameter of the protected component 60 is smaller than the outer diameter of the guide portion 43 of the shaft 40.

The leak detection belt 70 used in this embodiment is a model F03-16SF/16SFC produced by OMRON. As shown in FIGS. 2-4, the leak detection belt 70 surrounds the second end 42 of the shaft 40 and is embedded in the annular positioning groove 23 of the housing 20, so that the loop length of the leak detection belt 70 is greater than the circumference of the motor 30. In addition, a part of the leak detection belt 70 is set in the second groove 25 of the housing 20 to detect whether liquid enters the second groove 25.

It can be seen from the above that, as shown in FIG. 4, when the rotary seal member 50 fails and liquid enters the accommodation chamber 22 from the shaft hole 21, the guide portion 43 of the shaft 40 prevents the liquid from spraying directly to the protected component 60 on the one hand, and on the other hand introduces the liquid into the first groove 24 through the diversion channel 52, then the liquid will travel along the drainage channel 26 to the second groove 25 and contact with the leak detection belt 70. At this time, the leak detection belt 70 can be triggered to change color and send a detection signal to a controller (not shown in the drawing) to remind the operator that there is a liquid leakage condition and need to shut down immediately to avoid key components (such as the motor 30, the brake 47 or the protected component 60) from being damaged.

In addition, since the leak detection belt 70 is located near the rear end of the housing 20, if you need to replace it, you only need to remove some parts from the rear end of the housing 20. Other components such as the turntable 46, the protected component 60 or the motor 30 will not be affected. In this way, the re-calibration assembly steps can be omitted to improve work efficiency. As for the position of the first groove 24, another leak detection belt 70 can also be installed according to actual needs. The detection accuracy can be further improved by the two leak detection belts 70, so that the operator can more accurately grasp the leakage situation. It is worth mentioning that the leak detection belt 70 can also not surround the shaft 40, but is designed as a fragment directly stuck in the second groove 25 of the housing 20.

It needs to be supplemented here that the guide portion 43 has different structural designs depending on the nature of the liquid. For liquids with higher viscosity, the guide portion 43 protrudes from the side of the rotary seal member 50 with an oblique corner portion 432 (as shown in FIG. 5), or protrudes from one end with a hook portion 434 toward the protected component 60 (as shown in FIG. 6). The oblique corner portion 432 or hook portion 434 provides a diversion effect for liquids with higher viscosity. As for liquids with low viscosity, the guide portion 43 protrudes an annular flange 436 from the side opposite to the rotary seal member 50 (as shown in FIG. 7) or is recessed with an annular groove 438 (as shown in FIG. 8). The labyrinth design formed by the annular flange 436 and the annular groove 438 in conjunction with the corresponding concave-convex structure, on the one hand, does protect the protected component 60, and on the other hand, it provides a diversion effect for liquids with lower viscosity.

In summary, the rotary table 10 of the present invention uses the flow channel design of the height difference to direct the liquid entering the accommodation chamber 22 to the leak detection belt 70 avoiding the location of the key components, and uses the leak detection belt 70 to instantly detect whether there is liquid leakage, so as to achieve the effect of protecting key components. This is quite suitable for applications that require liquid flushing or soaking (such as but not limited to electrical discharge machining machines). In addition, the technical features provided by the present invention (that is, the flow channel design with height difference and real-time detection of the leak detection belt 70) are not limited to be applied to single-axis horizontal worktables, but can also be applied to a single-axis vertical worktable or a two-axis vertical and horizontal worktable according to actual needs, and the function of leakage detection can also be realized.

What is claimed is:

1. A rotary table, comprising:
a housing comprising an accommodation chamber, said accommodation chamber having a chamber wall thereof provided with a first groove, a second groove and a drainage channel, said drainage channel having opposing front end and rear end thereof connected to said first groove and said second groove respectively;
a motor installed in said accommodation chamber of said housing;
a shaft rotatably set in said accommodation chamber of said housing and connected to said motor, said shaft comprising a first end and a second end, said first end of said shaft having an outer periphery thereof provided with a guide portion; and
a leak detection belt set in said accommodation chamber of said housing with a part thereof set in said second groove of said housing-;
wherein said first groove is close to a front end of said housing, and said second groove is close to a rear end of said housing;
wherein said guide portion of said shaft guides liquid into said first groove, and then said liquid follows said drainage channel to said second groove and contacts said leak detection belt;
wherein a rotary seal member is located in said housing and abutted an outer peripheral surface of said first end of said shaft and forms a diversion channel with said guide portion of said shaft, said diversion channel being connected to said first groove of said housing;
wherein a protected component is set in said shaft and located on a side of said guide portion of said shaft opposite to said rotary seal member.

2. The rotary table as claimed in claim 1, wherein an outer diameter of said protected component is smaller than an outer diameter of said guide portion of said shaft.

3. The rotary table as claimed in claim 1, wherein a distance between said first groove and said accommodation chamber is smaller than a distance between said second groove and said accommodation chamber.

4. The rotary table as claimed in claim 3, wherein said housing further comprises a shaft hole, an extension direction of said first groove and an extension direction of said second groove are both perpendicular to an axis of said shaft hole, and an extension direction of said drainage channel is parallel to the axis of said shaft hole.

5. The rotary table as claimed in claim 1, wherein a distance between said drainage channel and said accommodation chamber gradually increases from said first groove to said second groove.

6. The rotary table as claimed in claim 1, wherein said housing further comprises a shaft hole located on a front end thereof and disposed in communication with said accommodation chamber; said first groove is closer to said shaft hole than said second groove; said first end of said shaft is partially protruded out of said housing through said shaft hole of said housing; said guide portion is located in said accommodation chamber of said housing.

7. The rotary table as claimed in claim 1, wherein one side of said guide portion opposite to said rotary seal member is provided with one of an oblique corner portion, an annular flange and an annular groove.

8. The rotary table as claimed in claim 1, wherein one end of said guide portion protrudes a hook portion toward said rotary seal member.

* * * * *